United States Patent [19]

Nakamura

[11] Patent Number: 4,558,641

[45] Date of Patent: Dec. 17, 1985

[54] APPARATUS FOR OSCILLATING FILTER CLOTH OF FILTER PRESS

[75] Inventor: Masayuki Nakamura, Osaka, Japan

[73] Assignee: Kurita Machinery Manufacturing Company Limited, Osaka, Japan

[21] Appl. No.: 559,186

[22] Filed: Dec. 7, 1983

[51] Int. Cl.⁴ .................. B30B 9/06; B01D 25/12; B01D 25/38
[52] U.S. Cl. .................................. 100/198; 210/225; 210/230; 210/236
[58] Field of Search ................. 210/225–230, 210/236, 384, 388; 100/198

[56] References Cited

U.S. PATENT DOCUMENTS

| | | | |
|---|---|---|---|
| 3,622,005 | 11/1971 | Kurita | 210/225 |
| 3,955,947 | 5/1976 | Hoon et al. | 210/388 X |
| 4,209,404 | 6/1980 | Yoshida | 210/225 |

FOREIGN PATENT DOCUMENTS

| | | | |
|---|---|---|---|
| 2158331 | 6/1972 | Fed. Rep. of Germany | 210/225 |
| 54-19622 | 7/1979 | Japan . | |
| 54-24747 | 8/1979 | Japan . | |

Primary Examiner—Peter Feldman
Attorney, Agent, or Firm—Holman & Stern

[57] ABSTRACT

A filter cloth oscillating apparatus for a filter press wherein the filter cloth generally suspended over springs from a filter cloth hanging rod extending laterally perpendicular to the direction in which filter plates are opened to oscillate the rod and cloth to shake off and filter cake adhering thereto has a drive unit and crank mechanism mounted on a moving bed for moving the upper portion of a filter press horizontally, an oscillating head and actuator therefor, and by means of a plurality of guide members for oscillating the head vertically as well as horizontally. The oscillating head is lowered and raised pneumatically so that in the covered position it can engage with and oscillate the filter cloth hanging rod.

8 Claims, 13 Drawing Figures

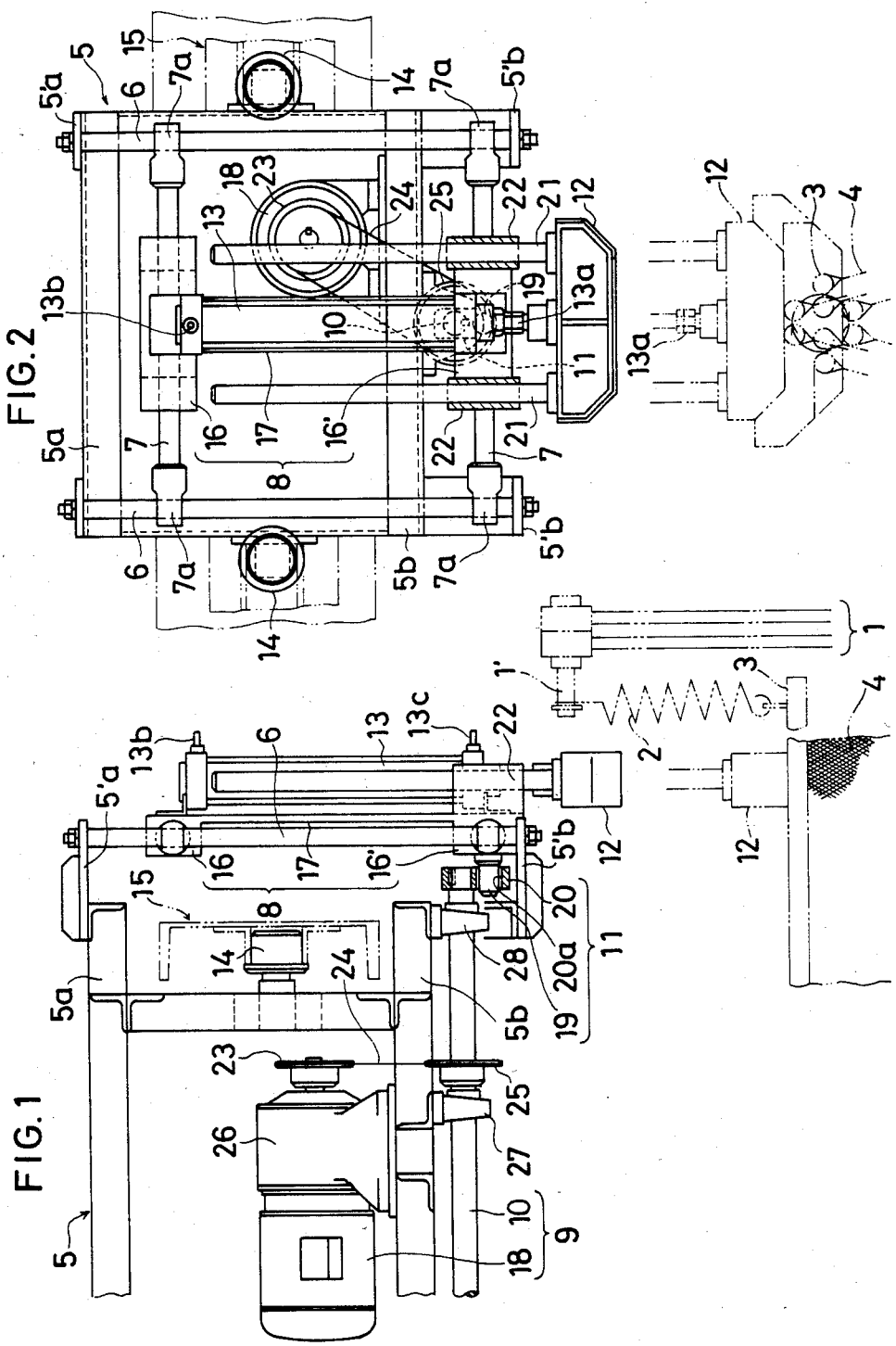

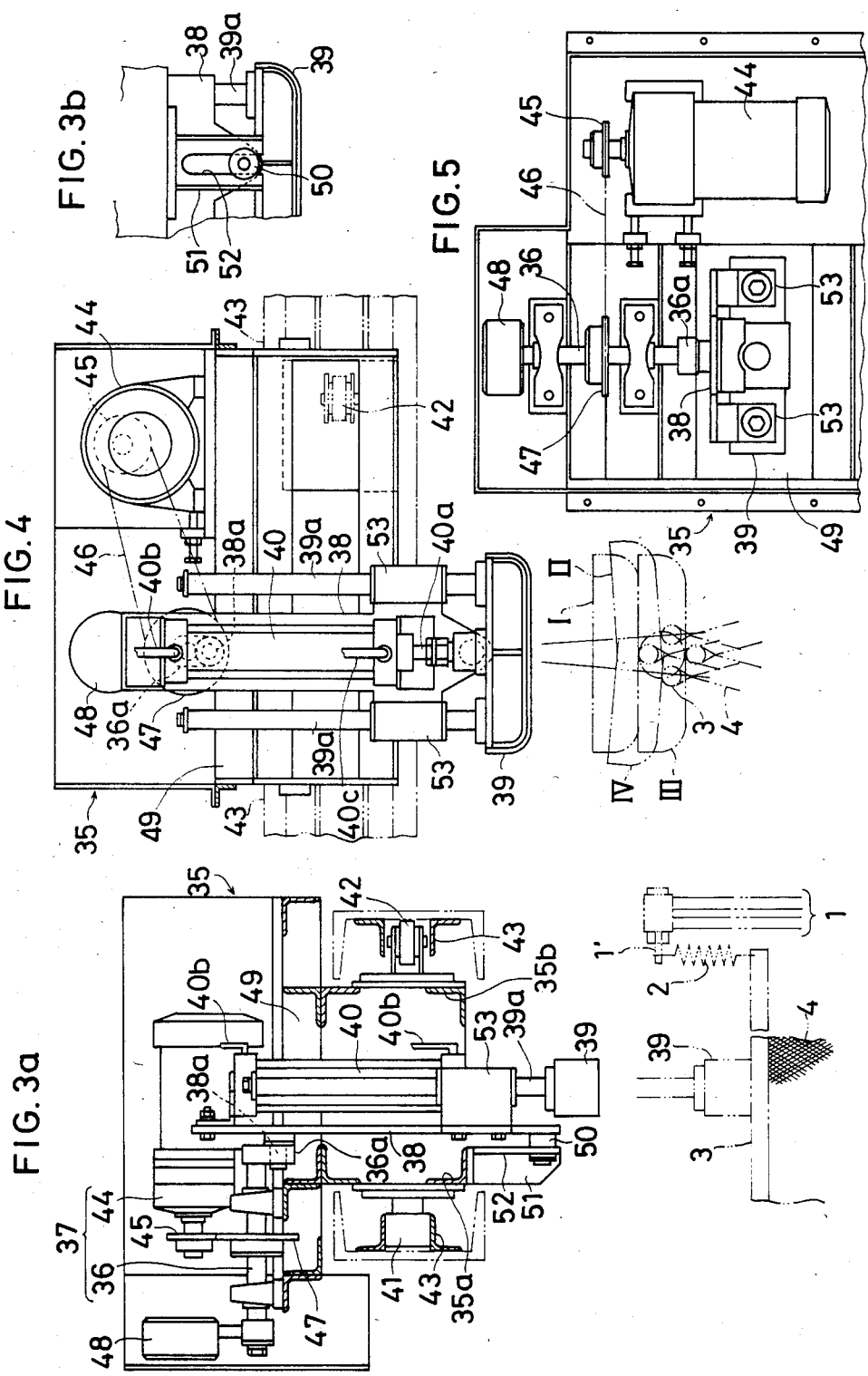

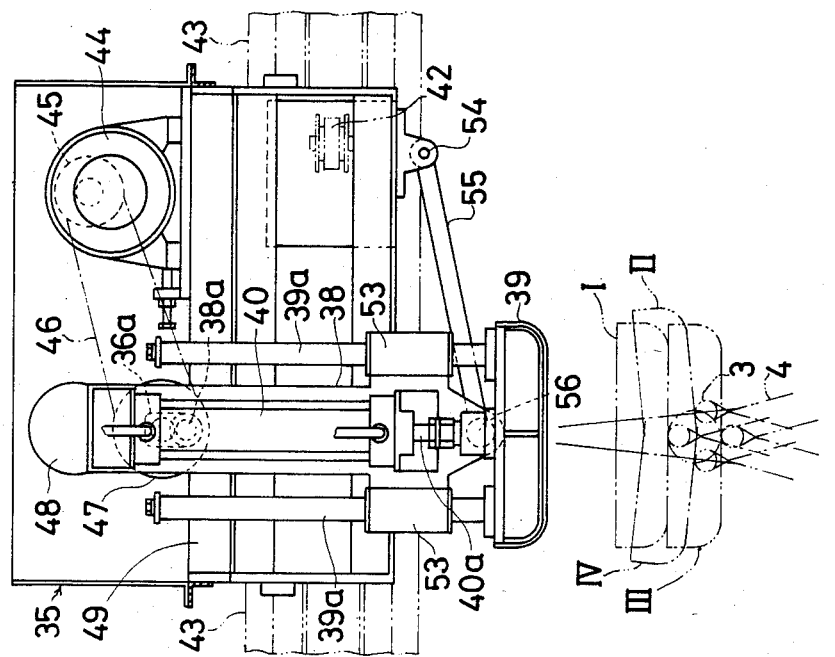
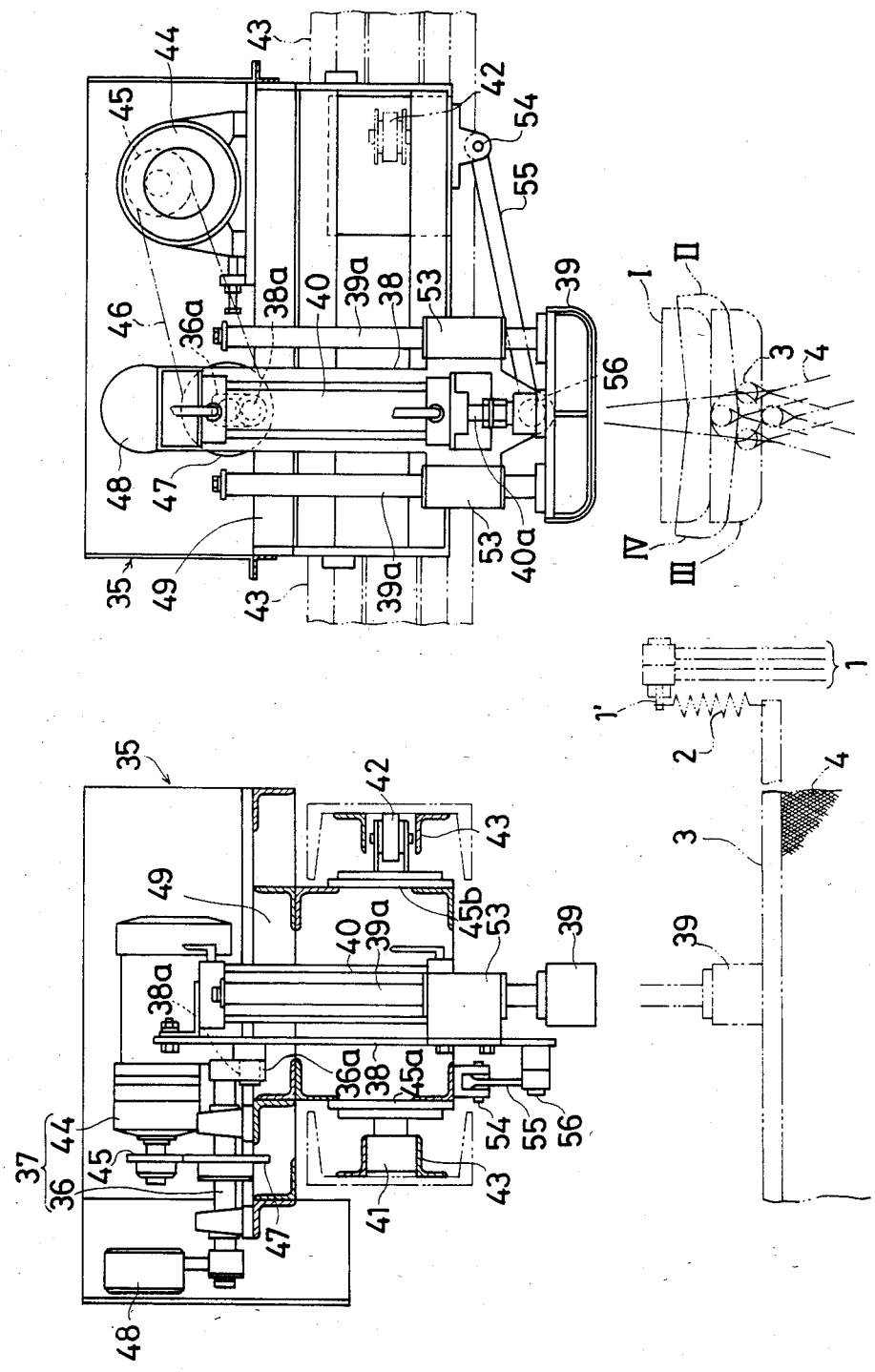

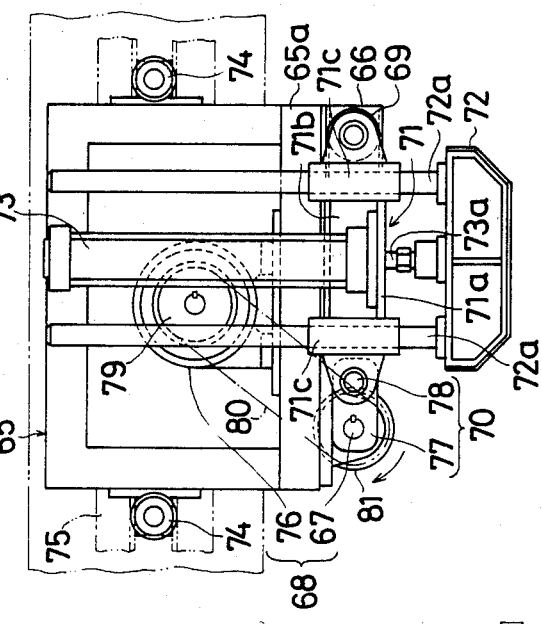
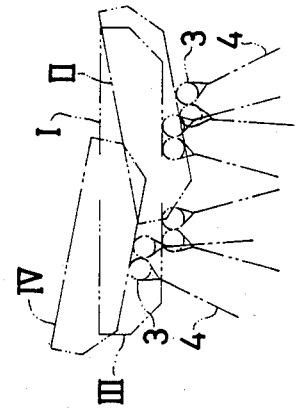
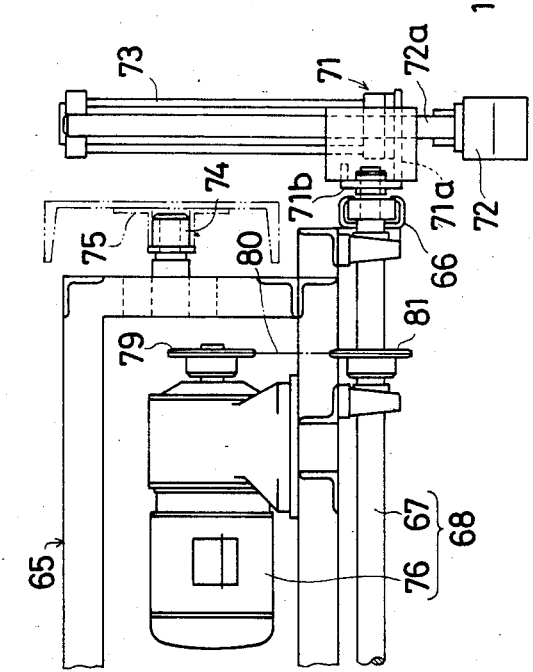
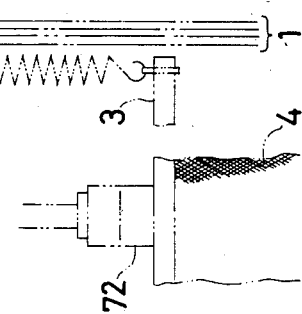

APPARATUS FOR OSCILLATING FILTER CLOTH OF FILTER PRESS

BACKGROUND OF THE INVENTION

1. Field of the Invention

The present invention relates to a filter cloth oscillating apparatus for a filter press, more particularly to an apparatus for giving oscillation to a filter cloth hanging rod suspended over springs in a direction perpendicular to the filter plate's opening direction so as to oscillate the filter cloth hung from the suspended rod thereby shaking filter cake off the filter cloth.

2. Description of the Prior Art

An example of the prior art relating to a filter cloth oscillating apparatus for a filter press of this type is disclosed in U.S. Pat. No. 3,622,005.

One improved apparatus for first lowering the oscillating head to where it comes into contact with the filter cloth hanging rod and then oscillating it horizontally for oscillating the filter cloth by the action of the wavy part in the lower end of the oscillating head is disclosed in (Japanese Publication No. Sho-54-19622) and another improved apparatus for transmitting the crank's rotary motion to the oscillating head to cause the oscillating head in contact with the filter cloth hanging rod to undergo a circular motion for oscillating the filter cloth is disclosed in Japanese Publication No. Sho-54-24747.

In the first Japanese publication the filter cloth hanging rod is oscillated with the wavy part at the lower end of the oscillating head, however, the filter cloth is subjected to friction as the oscillating head undergoes sliding motion, possibly resulting in injury of the filter cloth.

In the second Japanese publication in which circular motion is imparted to the oscillating head, the change of direction proceeds slowly in the horizontal cyclic motion of the oscillating head, hence the impact applied to the filter cloth hanging rod is weak and filter cloth oscillating effect is not sufficient.

The adhesiveness of the filter cake deposited on the filter cloth after filtration of the liquid to the filter cloth is very marked. Hence, for attaining removal of filter cake as thoroughly as possible, it is important in a filter press to be able to shake off the filter cake quickly without causing damage to the filter cloth.

SUMMARY OF THE INVENTION

It is the object of the present invention to provide a filter cloth oscillating apparatus for a filter press, which is free of the defects as described above, simple in construction, has the motion of the oscillating head well stabilized and also has the oscillation stroke easily variable.

BRIEF DESCRIPTION OF THE DRAWINGS

The invention will now be described in detail with reference to the accompanying drawings wherein:

FIG. 1 is a partially cross-sectional front elevational view showing an embodiment of the present invention, half of a laterally symmetric filter press;

FIG. 2 is a partially cross-sectional right side view FIG. 1.

FIG. 3a is a view similar to FIG. 1 of another embodiment of the present invention;

FIG. 3b is a right side view of a part of FIG. 3a,

FIG. 4 is a right side view of FIG. 3a;

FIG. 5 is a top plan view of FIG. 3a;

FIG. 6 is a view similar to FIG. 1 of still another embodiment of the invention;

FIG. 7 is a right side view of FIG. 6;

FIG. 8 is a front elevational view of a further embodiment of the present invention;

FIG. 9 is a right side view of FIG. 8;

DESCRIPTION OF THE PREFERRED EMBODIMENT

Figure 10:
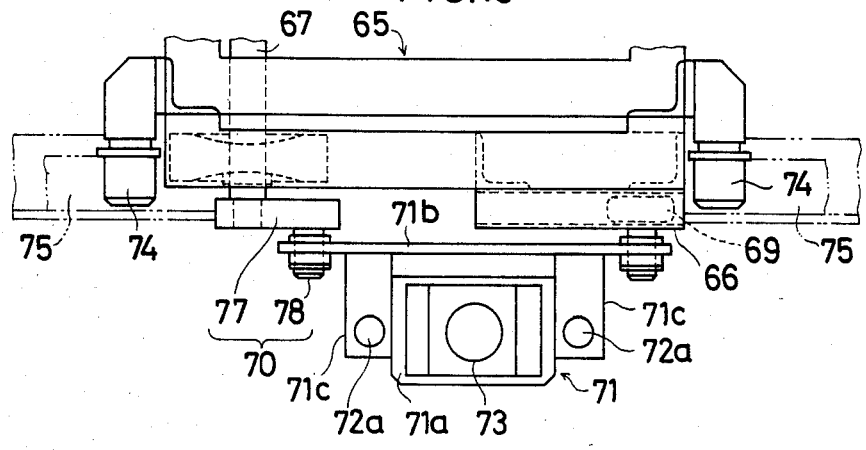
FIG. 10 is a fragmentary top plan view of FIG. 8.

The filter press to which the present invention is applied is identical with, for example, that disclosed in U.S. Pat. No. 3,622,005. Hence, although it is not illustrated here, a filter press of this known type has a lateral pair of horizontal filter plate supporting rails between a fixed end plate frame having a liquor inlet and the other end plate movable by hydraulic pressure and a plurality of filter plates supported thereby and therebetween to be freely slidable. And, as shown by imaginary lines in FIGS. 1 and 2, a filter cloth hanging rod 3 is suspended from pins 1' at the top end of a linked arm 1 between individual filter plates pivoted to both sides in the top of each filter plate over a coil spring 2, filter cloths 4 hung from the filter cloth hanging rod 3 extending downward between the individual filter plates to be pressed thereby during filtration.

According to the present invention, there is provided a frame-shaped movable bed 5 located above the filter press and freely movable both ways along the opening direction of the filter plates. There are connected perpendicular to the upper frame 5a and lower frame 5b of one side of the movable bed 5 vertical guide shafts 6, 6 by brackets 5'a, 5'b. Then, there are provided horizontal guide shafts 7, 7 vertically apart from each other with both ends thereof in free slidable relationship with the above-mentioned guide shafts 6.

As mentioned below, the above-mentioned horizontal guide shafts 7, 7 are provided with a head actuating means 8, a drive means 9 mounted on the above-mentioned movable bed 5 and a shaft 10 of the drive means 9 connected with the head actuating means 8 and there is also provided a crank means 11, which rotates with the shaft 10 to drive the head actuating means 8. The head actuating means 8 is connected with an oscillating head 12 which is, as described below, carried to be freely movable vertically and comes into contact with the filter cloth hanging rod 3 at the lower end of its stroke and also with a head lifting and lowering means 13 which lifts and lowers the above-mentioned oscillating head 12.

The movable bed 5 is in the shape of a rectangular parallelepiped frame, has 4 guide rollers 14 carried on both, front and rear, sides thereof mounted on a lateral pair of horizontal guide rails 15, 15 above the frame of the filter press and is moved in the filter plates' opening direction by means of an unillustrated chain conveyor.

The vertical guide shafts 6, 6 are supported apart from and parallel to each other between the upper frame 5a and lower frame 5b of one side of the movable bed 5. Meanwhile, the horizontal guide shafts 7, 7 with guide sleeves 7a, 7a formed at both ends thereof fitted with the individual guide shafts 6, 6 are mounted horizontally between the vertical guide shafts 6, 6 to be freely slidable vertically.

The head actuating means 8 is I-shaped with a vertically spaced pair of lateral guide sleeves 16, 16' connected by a vertical stiffener 17. The above lateral guide sleeves 16, 16' are mounted on the horizontal guide sleeves 7, 7 respectively so as to be freely slidable both ways along the moving direction of the filter plates. Since in this construction the horizontal guide shafts 7 are free to move vertically along the above-mentioned guide shafts 6, 6, it means that the head actuating means 8 produces a motion unrestrained also vertically.

The drive means 9 is composed of a motor 18 and a shaft 10 driven thereby. The shaft 10 is carried by bearings 27, 28 on the underside of the movable bed 5 perpendicular to the actuating vertical face of the head actuating means 8. The torque produced by the motor 18 is transmitted through a speed reducer 26, sprocket 23, chain 24 and sprocket 25 to the shaft 10. Meanwhile, a crank means 11 is composed of a crank pin 19 projecting from the rear end of the lateral guide sleeve 16' under the head actuating means 8 and a crank arm 20 fixedly connected to one end of the shaft 10 and carrying the above crank pin 19 rotatably in the pin accommodating hole 20a in its tip.

The head lifting and lowering means 13 comprises a pneumatic actuator, whose piston rod 13a is vertically orientated and connected perpendicularly to the front face of vertical stiffener 17 of the head actuating means 8 for lifting and lowering the oscillating head 12 connected to the lower end of the piston rod 13a with respect to the filter cloth hanging rod 3 underneath.

On the top of the oscillating head 12 there are provided a pair of upright guide shafts 21, 21, which are fitted through vertical sleeves 22, 22 formed at both ends of the lower lateral guide sleeve 16' of the head actuating means 8. Smooth lifting and lowering of the oscillating head 12 with respect to the head actuating means 8 is thus ensured. It is desirous to have the underside of the oscillating head 12 which comes into contact with the filter cloth hanging rod 3 provided with rubber sheet or cloth so as to prevent slipping of the oscillating head 12 with respect to the filter cloth hanging rod 3.

Compressed air supply pipings 13b, 13c connected to the cylinder of the head lifting and lowering means 13 are disposed above bed guide rails 15, 15 with enough slack to allow movement of the movable bed 5.

The operation of the above-described embodiment is as follows.

When, with filtration over, the filter plates are being opened successively, the movable bed 5 is moved by means of the unillustrated chain the right above the filter cloth 4 between the opened filter plates. Then, the head lifting and lowering means 13, in response to manipulation of the compressed air supply control means, lowers the oscillating head 12 as indicated in phantom in FIG. 1 to where it can act on the filter cloth hanging rod 3.

When the motor 18 is started with the oscillating head 12 lowered to where it can act on the filter cloth hanging rod 3 as mentioned above, the shaft 10 is driven to rotate via sprocket 23, chain 24 and sprocket 25 and its torque is transmitted via crank means 11 to the head actuating means 8. The freedome of the head actuating means 8 to move horizontally guided by the horizontal guide shafts 7, 7 and the freedom of the horizontal guide shafts 7, 7 to move vertically guided by the vertical guide shafts 6, 6 allow the head actuating means 8 to make a circular motion with the shortest distance between the shaft 10 and the crank pin 19 as radius. Hence the oscillating head 12 supported by the head actuating means 8 similarly undergoes a circular motion. Accordingly, the filter cloth hanging rod 3 pressed down by the oscillating head 12 undergoes a circular motion as indicated in phantom in FIG. 2, and the filter cloth 4 is swung forward and backward, that is, along the direction in which filter plates open, being oscillated vertically as well. Further, besides the above-mentioned motion caused by the oscillating head 12, there is a motion in which the filter cloth hanging rod 3 undergoes a sliding movement in the opposite direction, and since the filter cloth is thus subjected to positive oscillation not only vertical but also longitudinal, the filter cake adhering to the filter cloth 4 can be effectively shaken off.

In this embodiment, freedom to move horizontally as well as vertically is imparted to the head actuating means 8 by guiding it horizontally directly by means of the horizontal guide shafts 7, 7 on the one hand and by guiding the horizontal guide shafts 7, 7 vertically by means of the vertical guide shafts 6, 6 secured to the movable rod 5 on the other hand. Besides such example, however, it is also possible, conversely, to guide the oscillating head 12 directly and vertically by means of the vertical guide shafts 6, 6 and the vertical guide shafts 6, 6 by means of the horizontal guide shafts 7, 7 secured to the movable bed.

According to the filter cloth oscillating apparatus of the present invention, it is possible to stabilize the circular motion of the head actuating means 8 by a simple structure made up of vertical and horizontal guide members, without unduly complicating the construction and, moreover, to adjust the stroke of the oscillating head 12 by simply changing the length of the crank arm 20 of the crank means 11, the filter cloth oscillating apparatus of the invention thus having a good general-purpose feature.

Shown in FIGS. 3 through 5 is another embodiment, in which, as in the aforesaid embodiment, a movable bed 35 disposed above the filter press is adapted to be driven by a drive shaft 36 above, and the guide rollers 41, 42 supported by both side walls 35a, 35b below are guided by a pair of movable bed rails 43 disposed above the filter cloth hanging rod 3. Also, as in the aforesaid embodiment, the movable bed 35 is movable in the filter plate's opening direction by means of a chain conveyor (not shown).

A drive means 37 comprises a motor 44 mounted on the movable bed 35 and the drive shaft 36 which is carried at a level half the height of the movable bed 35 with its axis parallel to the filter cloth hanging rod 3 and arranged to be driven by a motor 44 through a sprocket 45, chain 46 and another sprocket 47. Numeral 48 designates an inertia device with one end thereof secured to the drive shaft 36. This inertia device 48 serves to stabilize the rotation of the drive shaft 36 so that the filter cloth hanging rod 3 is oscillated by the latter vigorously and stably against the tension of the spring 2.

In this embodiment there is provided as head actuating means a member 38 (hereinafter referred to as "actuator"), which is arranged to be worked on the movable bed 35 by a crank 36a driven by the drive means 37.

The actuator 38 is disposed vertically to extend downward through an opening 49 made around the center on the side nearer to the drive shaft 36 of the movable bed 35 and a pin 38a projecting from its side near the top is connected with the crank 36a of the drive shaft 36. A guide pin 50 is provided, projecting from its side near the bottom toward the drive shaft 36 through a slot 52 in a guide member 51 disposed to extend from the lower end face of the movable bed 35 parallel to the actuator 38. It is thereby arranged so that, when the upper end of the actuator 38 is caused to make a "crank motion", its lower end is moved vertically by the same stroke. There is also provided a head lifting and lowering means 40. This head lifting and lowering means 40 consists essentially of a pneumatic actuator, and an oscillating head 39 connected to the lower end of its downwardly disposed piston rod 40a extends downward toward the filter cloth hanging rod 3. On both sides, left and right, of the top of the oscillating head 39 there are provided a pair of guide shafts 39a, 39a projecting upward therefrom, and these are fitted through vertical guide sleeves 53, 53 extending from the underside of the actuator 38 on both sides thereof so as to allow smooth lifting and lowering motion of the oscillating head 39 with respect to the actuator 38. The lower end face of the oscillating head 39 which comes into contact with the filter rod hanging rod 3 is covered with rubber sheet or cloth so as to prevent slipping of the oscillating head 39 against the filter cloth hanging rod 3.

Compressed air supply pipings 40b, 40c connected to the cylinder of the head lifting and lowering means 40 are arranged above movable bed guide rails 43 to have ample slack so as to allow the movement of the movable bed 35, this being the same as in the aforementioned embodiment.

Now described is the operation of this filter cloth oscillating apparatus.

When, with filtration over, the filter plates are being opened successively, the movable bed 35 is moved by means of the unillustrated chain conveyor to a position right above the filter cloth 4 between the opened filter plates. Then the compressed air supply control means (not shown) is started, and the oscillating head 39 is lowered by the head lifting and lowering means 40 to where it can act on the filter cloth hanging rod 3 as shown in phantom in FIG. 3.

When the motor 44 is started with the oscillating head 39 lowered as aforesaid and ready to act on the filter cloth hanging rod 3, the drive shaft 36 is driven through the sprocket 45, chain 46 and sprocket 47, and the rotation (torque) of the drive shaft 36 is transmitted via the crank 36a to the actuator 38. The actuator 38 so driven enters into a vertical (reciprocating) motion along the slot 52 to be oscillated with the guide pin 50 as the center, for this guide pin 50 near the bottom of the actuator 38 is engaged in the slot 52 of the guide member 51 secured to the movable bed 35.

Hence, as shown in phantom in FIG. 4, the oscillating head 39 integral with the actuator 38 is oscillated in contact with the filter cloth hanging rod 3, the way it oscillates being as shown in the figure by the sketch below in which (I) (II) (III) (IV) show the order of steps in a cycle of oscillation. Since, as it undergoes a cycle of oscillation, the direction in which it presses on the filter cloth hanging rod 3 is changed successively, the filter cloth 4 is subjected to a vigorous shaking motion. Hence, even flakes of filter cake known to be difficult to remove can be effectively shaken off the filter cloth 4, to say nothing of larger, sticky masses of filter cake.

The vertical amplitude of the oscillating head 39 is adjustable by simply changing the length of the crank 36a of the drive shaft 36, and the filter cake shaking effect of the filter cloth 4 can be adjusted more elaborately by combining the above adjusting means with adjustability of the speed (rpm) of the drive shaft 36'. The inertia device 48 attached to the drive shaft 36 helps in stabilizing the rotation thereof, so that by the aid of this inertia device 48 the filter cloth hanging rod 3 can be oscillated vigorously and stably against the tension of the spring 2 for efficient shaking-off of the filter cake even when the tension of this spring 2 (of the filter cloth hanging rod 3) is relatively high and possibly also irregular or subject to fluctuation.

The slot 52 of the guide member 51, which is provided in this embodiment to extend vertically, can have its direction and/or shape modified for increased variety of the patterns of oscillation of the actuator 38.

FIGS. 6 and 7 show a modification of the above-described embodiment, wherein the actuator 38, which with its guide pin 50 engaged in the slot 52 of the guide member 51 was retained in the above embodiment to be freely slidable (along the slot 52), has one end thereof rotatably connected by the pin 56 with the end of the oscillating arm 55 which is pivoted at its other end with a pin (supporting shaft) 54 to the movable bed 35 under the motor 44.

When the lower end of the actuator 38 is thus retained by pivoting, the oscillation amplitude at the lower end of the actuator 38 is freely adjustable by changing the length of the oscillating arm 55 in proportion to the crank 36a. The effects attainable by this modified embodiment are identical with those of the aforementioned embodiment.

Still another embodiment of the present invention is shown in FIGS. 8 through 12.

As in the aforesaid embodiment, a movable bed 65 freely movable both ways along the filter plate's moving direction is here disposed above the filter press. In this embodiment, as seen from FIGS. 9, 10 and 11, there is provided a horizontal guide rail 66 on one side of the movable bed 65 near its bottom. As in the embodiments mentioned above, a drive shaft 67 is disposed on the movable bed 65 parallel to the filter cloth hanging rod 3, and this together with a motor 76 constitutes a drive means 68. There is also provided a head actuator 71 with a roller 69 disposed near its bottom as a slide means guided by the above-mentioned horizontal guide rail 66. The function as well as purpose of this head actuator is identical with that of the head actuator 8 and the actuator 38 in the preceding embodiments. This head actuator 71 is provided with an oscillating head 72, which can be lowered to where it can act on the filter cloth hanging rod 3, and a head lifting and lowering means 73 for vertical driving thereof.

The movable bed 65 has a parallelepiped frame guide rollers 74 pivoted at the front and rear ends on both sides of the movable bed 65 carried on a lateral pair of movable bed guide rails 75 disposed parallel to the filter plate guide rails above the filter press, and the movable bed 65 is adapted to be movable both ways by means of a chain conveyor (not shown) in the filter plate opening direction, all these arrangements being identical with the preceding embodiments.

The above-mentioned guide rail 66 is made of channeled steel with a lip and is fixed to a lower frame 65a secured to one side of the movable bed 65 with the open side outward.

The head actuator 71 is shaped in cross-section with a horizontal bottom plate portion 71a and a vertical back plate portion 71b, and at one end of the vertical back plate portion 71b the slide roll roller 69 is carried.

Figure 11:
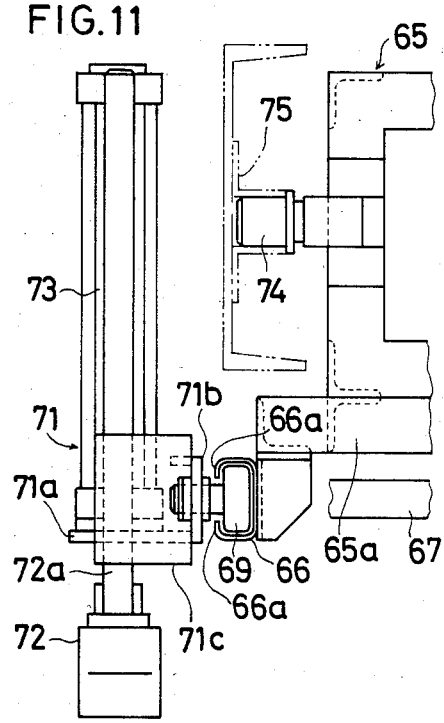
FIG. 11 is a fragmentary rear view of FIG. 8.

This slide roll roller 69 is fitted in the horizontal guide rail 66 and, as shown in FIG. 11, its inward flange portion 66a is provided to retain the roller 69. A crank means 70 consists of a crank arm 77 fixed to one end of the drive shaft 67 and a crank pin 78 projecting from the forward end of the crank arm pivoted to the other end of the vertical back plate portion 71b. When the drive shaft 67 rotates, the head actuator 71 is caused to oscillate by the crank means 70.

The head lifting and lowering means 73 consists essentially of a pneumatic actuator, with its piston rod 73a extending downward and perpendicular to the horizontal bottom plate portion 71a for the oscillating head 72 connected to the lower end of the piston rod 73a to be lifted and lowered thereby with respect to the filter cloth hanging rod 3. There are provided another pair of sliding shafts 72a perpendicular to the upper end face of the oscillating head 72 on both, left and right, sides thereof, and these sliding shafts 72a are fitted through vertical guide sleeves 71c formed at both ends of the horizontal bottom plate portion 71a of the head actuator 71 so as to allow smoother lifting and lowering of the oscillating head 72 with respect to the head actuator 71.

The compressed air supply piping to be connected to the cylinder portion of the head lifting and lowering means 73 is omitted in the drawings.

Now described is the operation of the embodiment shown in FIGS. 8 through 12.

When, with filtration over, the filter plates are being opened successively, the movable bed 65 is moved by means of the unillustratedd chain conveyor to a position right above the filter cloth 4 between the opened filter plates. Then the compressed air supply control means (not shown) is started, and the oscillating head 72 is lowered by the head lifting and lowering means 73 to where it can act on the filter cloth hanging rod 3 as shown by the imaginary line in FIG. 8.

Figure 12:
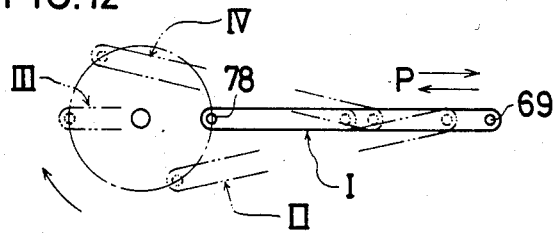
FIG. 12 is a schematic view illustrating the function of the invention.

When the motor 76 is started with the oscillating head 72 lowered and ready to act on the filter cloth hanging rod 3, the drive shaft 67 is driven via the sprocket 79, chain 80 and sprocket 81, the rotation (torque) of the drive shaft 67 is transmitted via the crank 70 to the head actuator 71 and the head actuator 71 connected correspondingly to the connecting rod of the crank mechanism 70 undergoes an oscillating motion with the slide roller 69 as fulcrum, the way it oscillates being as shown in FIG. 12 in which (I) (II) (III) (IV) show the order of steps in a cycle of oscillation. In this oscillating motion, the roller 69 of the slide means is guided by the horizontal guide rail 66 to undergo a reciprocating motion as indicated by the arrow P in FIG. 12.

As the head actuator 71 is thus oscillated, the oscillating head 72 integral therewith undergoes oscillation in contact with the filter cloth hanging rod 3 as illustrated by the imaginary line in FIG. 9. (I') (II') (III') (IV') in FIG. 9 correspond to (I) (II) (III) (IV) in FIG. 12 respectively.

In the oscillating motion of the oscillating head 72, the oscillation head 72 oscillates not only vertically but the direction in which it acts on the filter cloth hanging rod 3 is successively changed so that the filter cloth 4 is subjected to a vigorous shaking motion, hence the filter cake adhering to the filter cloth 4 is effectively shaken off. Moreover, since the oscillating head 72 is slanted to limit the restoring motion of the filter cloth hanging rod 3 when the oscillating head 72 is deformed longitudinally for the strong restitution force of the coil spring 2 to act on the filter cloth hanging rod 3, there is little risk of the oscillating head 72 undergoing sliding friction against the filter cloth hanging rod 3 as it oscillates. This means that troubles such as damage of the filter cloth 4 due to friction with the oscillating head 72 can safely be avoided.

The effects attainable by the construction of the above-described embodiment are as follows.

Since the oscillating head 72 undergoes not a circular motion in the horizontal posture but a three-dimensional oscillating motion, the direction in which it acts on the filter cloth hanging rod 3 is successively changed so that the filter cloth is subjected to a vigorous shaking motion, hence the filter cake adhering to the filter cloth 4 is effectively shaken off.

For supporting the head actuator 71 to be movable with respect to the moving bed 65, one end of the head actuator 71 is engaged with the horizontal guide rail 66 via the slide roller 69 and the other end thereof is engaged with the drive shaft 67 via the crank means 70, the supporting structure being thus very simple yet quite dependable.

Also, the oscillation stroke of the oscillating head 72 is easily adjustable by simply changing the length of the crank arm 77 of the crank 70, hence the filter cloth oscillating apparatus according to this embodiment has a good general-purpose feature.

I claim:

1. In a filter cloth oscillating apparatus for a filter press wherein the filter cloth hangs from a rod suspended from springs and extends laterally perpendicular to the direction of opening of filter plates of the press, the oscillating apparatus being mounted on a bed movable horizontally in the direction of opening of the filter plates and having a head movable upwardly and downwardly to a position of contacting engagement with the filter cloth hanging rod, the improvement comprising:

a plurality of spaced vertical guide shafts mounted on the bed;

a plurality of spaced parallel horizontal guide shafts operatively supported on said vertical guide shafts for slidable movement along said vertical guide shafts;

a head actuating means operatively supported on said horizontal guide shafts for slidable movement along said horizontal guide shafts;

crank means operatively mounted on the bed and operatively connected to said head actuating means to slidably move said head actuating means on said guide shafts;

head raising and lowering means operatively mounted on said head actuating means and operatively connected to said head to raise and lower said head with respect to said head actuating means; and drive means mounted on the bed and operatively connected to said crank means to operate said crank means;

said guide shafts, head actuating means, and crank means being cooperatively arranged so that said head is movable by said crank means in an oscillating motion in a vertical plane.

2. An apparatus as claimed in claim 1 wherein said plurality of horizontal guide shafts comprises an upper and lower horizontal guide shaft; and further comprising a horizontal guide sleeve slidably mounted on each horizontal guide shaft, and a pair of spaced vertical head guiding elements slidably supported in said guide sleeve on said lower horizontal guide shaft and connected to said head.

3. An apparatus as claimed in claim 2 wherein said crank means comprises a crank shaft rotatably mounted on said bed operatively connected to said drive means to be driven thereby;

a crank arm mounted on said shaft to be rotated thereby; and a crank pin mounted on said guide sleeve on said lower horizontal guide shaft rotatably connected to said crank arm so that rotation of said crank shaft produces said oscillating motion of the head.

4. An apparatus as claimed in claim 2 wherein said head raising and lowering means comprises:

a fluid actuated piston and cylinder unit the cylinder of which is mounted on and extends between said horizontal guide sleeves; and a piston rod extending from said cylinder and connected to said head.

5. In a filter cloth oscillating apparatus for a filter press wherein the filter cloth hangs from a rod suspended from springs and extends laterally perpendicular to the direction of opening of filter plates of the press, the oscillating apparatus being mounted on a bed movable horizontally in the direction of opening of the filter plates and having a head movable upwardly and downwardly to a position of contacting engagement with the filter cloth hanging rod, the improvement comprising:

a crank shaft rotatably mounted on the bed;

a crank arm on said crank shaft to be rotated thereby;

drive means operatively connected to said crank shaft to rotate said shaft;

a head actuating member operatively connected at one position thereof to said crank arm and at a second position to said bed so that said second position is moved reciprocally with respect to said bed by circular oscillation at the first position produced by said crank arm;

means to support the head on said head actuating member for movement therewith; and head raising and lowering means on said head actuating member and connected to the head to move the head relative to said head actuating member.

6. An apparatus as claimed in claim 5 wherein:

said head actuating member extends substantially vertically and is operatively connected at said one position to said crank arm to be oscillated near the upper end in a circular motion; and further comprising a guide member mounted on the bed adjacent the lower end of said head actuating member;

a vertical guide slot in said guide member;

a guide pin mounted on said head actuating member at said second position adjacent the lower end thereof and operatively slidably engaging in said guide slot;

so that oscillating motion at the upper end of said head actuating member by said crank arm produces oscillation of said head.

7. An apparatus as claimed in claim 5 wherein:

said head actuating member extends substantially horizontally with respect to said bed; and further comprising a horizontal guide rail on said bed disposed in a vertical plane extending parallel to the direction in which the filter plates are opened; and a roller pivotally mounted on said head actuating member at said second position operatively engaging said guide rail for guiding rolling engagement therein.

8. In a filter cloth oscillating apparatus for a filter press wherein the filter cloth hangs from a rod suspended from springs and extends laterally perpendicular to the direction of opening of filter plates of the press, the oscillating apparatus being mounted on a bed movable horizontally in the direction of opening of the filter plates and having a head movable upwardly and downwardly to a position of contacting engagement with the filter cloth hanging rod, the improvement comprising:

a crank shaft rotatably mounted on the bed;

a crank arm on said crank shaft to be rotated thereby;

drive means operatively connected to said crank shaft to rotate said shaft;

a head actuating member extending substantially vertically and having an upper and a lower end;

means to operatively connect said head actuating member near said upper end to said crank arm to be oscillated thereby in a circular motion;

a guide arm pivotally connected at one end to said bed and at the other to said head actuating member near said lower end;

means to support the head on said head actuating member for movement therewith; and head raising and lowering means on said head actuating member operatively connected to the head to move the head relative to said head actuating member;

so that oscillating motion at said upper end produced by said crank arm oscillates said head.

* * * * *